United States Patent [19]

Tidwell

[11] 3,937,138
[45] Feb. 10, 1976

[54] BARBECUE GRILL

[76] Inventor: Felix M. Tidwell, Suite 207 Lexington Bldg., 3319 Maguire Blvd., Orlando, Fla. 32803

[22] Filed: Jan. 28, 1974

[21] Appl. No.: 436,835

[52] U.S. Cl. .............................. 99/450; 126/25 R
[51] Int. Cl.² .......................................... A47J 37/06
[58] Field of Search ............ 99/450, 340, 444, 445, 99/446, 447; 126/9, 25

[56] References Cited
UNITED STATES PATENTS

| 3,973 | 3/1845 | Hawkins ......................... 99/450 X |
| 2,108,713 | 2/1938 | Hillman ......................... 99/450 X |
| 2,723,617 | 11/1955 | Dreyfus ............................... 99/444 |
| 2,812,706 | 11/1957 | Del Francia et al. ................ 99/446 |
| 2,980,100 | 4/1961 | Bamberger ........................... 126/25 |
| 3,033,189 | 5/1962 | Clark .............................. 99/340 X |
| 3,085,497 | 4/1963 | Statia, Sr. .......................... 99/340 |
| 3,088,393 | 5/1963 | Huckabee ............................ 99/340 |
| 3,092,015 | 6/1963 | Tucker et al. ....................... 99/446 |
| 3,667,376 | 6/1972 | Thompson ........................ 99/446 X |

FOREIGN PATENTS OR APPLICATIONS

| 85,056 | 5/1920 | Switzerland ......................... 99/450 |

Primary Examiner—Harvey C. Hornsby
Assistant Examiner—Arthur O. Henderson
Attorney, Agent, or Firm—Roylance, Abrams, Berdo & Kaul

[57] ABSTRACT

A barbecue grill having a grate comprised of a plurality of parallel, spaced apart slats defining minute slots therebetween the distance between edges of adjacent slats being substantially less than the width of each slat. The grate is supported above a charcoal fire and supports food thereon, whereby the food undergoes the processes of frying, broiling, grilling and smoking.

6 Claims, 9 Drawing Figures

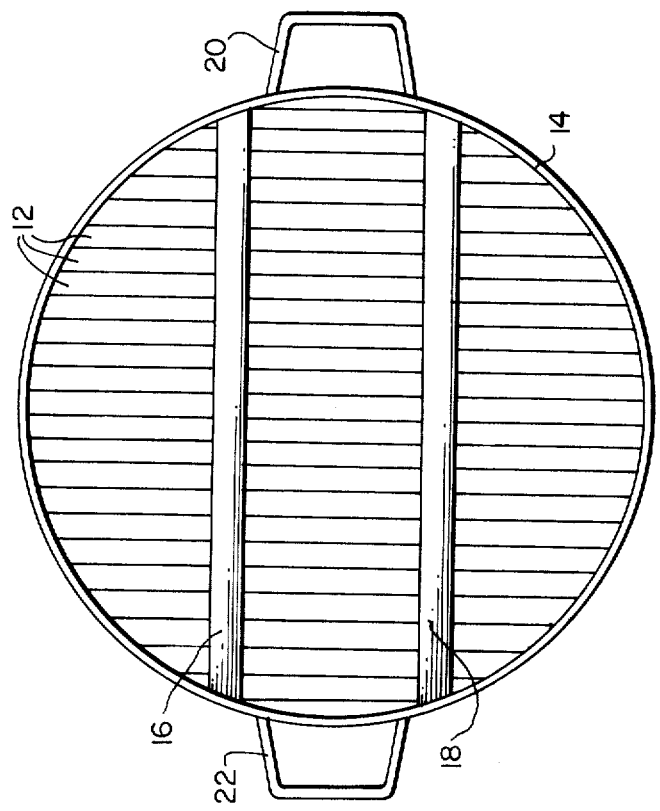
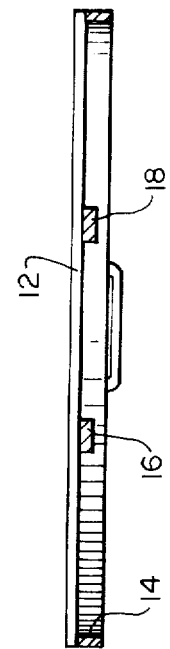
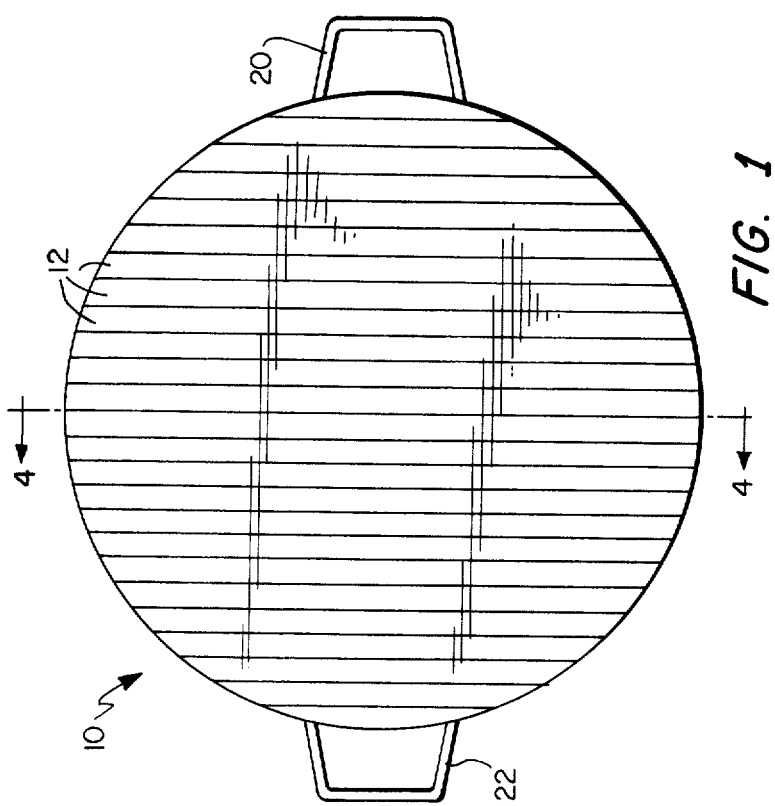
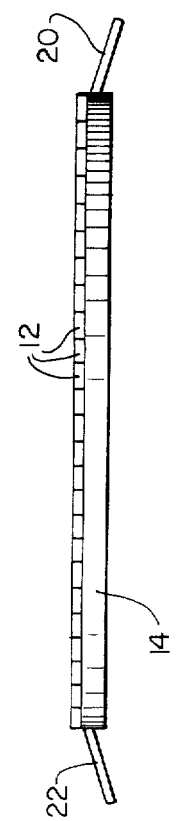

BARBECUE GRILL

The present invention relates to barbecue grills, and more particularly, it relates to a grate for a barbecue grill allowing food placed thereon to be simultaneously fried, broiled, grilled and smoked.

As used herein, "smoking" is defined as a process resulting from the contact of food substances with smoke which provides the food with the flavor of the smoke. "Frying" is the process of cooking food substances with the use of either the heated fat or other juices released from the food substance itself or fat and sauces added thereto, such fats, sauces or combination thereof being referred to as the "frying substance". "Broiling" is the process of cooking food substances by means of direct exposure to radiant heat. And "grilling" means the process of cooking food substances by the direct contact of the food with a heated metal substance.

In conventional barbecue devices a metal grate is supported above a charcoal type of fire and various foods, such as meat, fish and poultry, are placed on top of the grate and exposed to the heat of the charcoal fire so they are both broiled and grilled. Commonly, the metal rods forming the grate are spaced widely apart so that the foods resting on the grill are smoked by the rising smoke formed when fat or juices fall on the coals and obtain what is commonly referred to as a "charcoal or barbecue flavor".

These grates usually consist of fairly narrow rods often having a circular cross section, which rods are spaced apart from adjacent rods a distance which is substantially greater than the width of each rod. Consequently, the food resting on the grill is unevenly heated because a large portion of the food is broiled by radiant heat from the charcoal fire and a small portion is grilled from the heat transferred thereto from the narrow metal rods. Quite typically, the solid fat contained in the food is heated to a point where it becomes liquid, at which time it is released from the food and falls through the spaces between the rods into the charcoal fire itself. The consequence of a substantial amount of fat falling on the coals is a flareup of the charcoal flame resulting in a scorched layer on the bottom of the food and a rather severe fire and smoke hazard.

In addition to the fat released from the food itself, a substantial part of any fat or sauce added to the food also tends to fall through the spaces between the rods. Thus, the food tends to dry out during cooking and any frying action of the fat and sauce is prevented. Consequently, a desirable fried flavor or taste is not rendered to the food.

Accordingly, in these prior art devices although the food is smoked, broiled and grilled, there is no frying of the food and the broiling and grilling are usually uneven.

To the contrary, a grate in accordance with the present invention allows the smoking, broiling, grilling and frying of food supported thereon in a manner which provides a highly palatable taste through the combination of these four processes.

Therefore, it is an object of the present invention to provide a grate for a barbecue grill upon which food may be smoked, broiled, grilled and fried simultaneously.

A further object of the present invention is to provide a grate for a barbecue grill capable of evenly broiling and grilling food placed thereon and preventing loss of fats contained in the food or fats or sauces added thereto.

Another object of the present invention is to provide a grate for a barbecue grill which reduces the fat loss from food cooked thereon, concomitantly reducing fire hazards caused by fat dripping on an open charcoal fire.

The foregoing objects are attained by providing a grate for a barbecue grill, the grate to be positioned above a heat source such as a charcoal fire and to support food to be cooked by the heat therefrom, comprising a metal support assembly means for supporting the food and for supporting a substantial portion of a frying substance in a position contiguous to the food, said support assembly means also defining areas for permitting smoke from the fire to pass through said support assembly means and contact the food supported thereon, said support assembly means including a plurality of parallel, spaced apart slats defining a plurality of minute slots therebetween.

Other objects, advantages and salient features of the present invention will become apparent from the following detailed description, which, taken in conjuction with the annexed drawings, discloses a preferred embodiment of the present invention.

Referring now to the drawings which form a part of this original disclosure:

FIG. 1 is a top plan view of a grate for a barbecue grill formed in accordance with the present invention;

FIG. 2 is a bottom plan view of the grate;

FIG. 3 is a side elevational view of the grate;

FIG. 4 is a sectional view of the grate taken along line 4—4 of FIG. 1;

Figure 5:
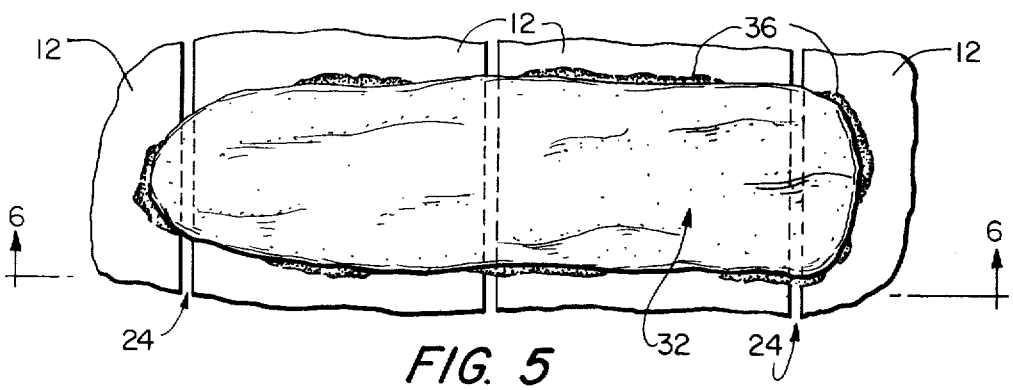
FIG. 5 is a top plan view of a portion of four parallel slats of the grate of FIGS. 1–4 showing the slots therebetween and showing a food substance supported on the top of the slats.

Referring now to the drawings in more detail, as shown in FIGS. 1–4, the grate, generally designated 10, is comprised of a plurality of slats 12, a ring 14, two support rods 16 and 18, and two handles 20 and 22. These elements are formed from metal, preferably rolled or stainless steel.

Figure 6:
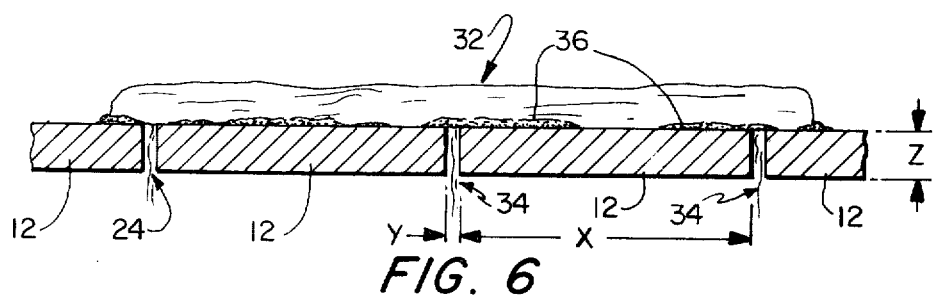
FIG. 6 is a sectional view taken along line 6—6 of FIG. 5 showing a food substance supported on the top of the slats.

Each slat 12 is an elongated steel bar having a rectangular cross section. As seen in FIG. 6, each slat 12 has a width X and a height Z.

As shown in FIG. 1, the slats 12 are arranged in a spaced, side-by-side, parallel relationship, defining minute slots 24 therebetween, each slot having a rectangular cross-section as shown in FIGS. 5 and 6. The width of each of the slots 24 is the same and is designated Y. The slats 12 vary in length, the largest having a length substantially equal to the diameter of the ring 14 and the smallest having a length substantially equal to two-thirds of the radius of the ring 14. The surface provided by the slats is circular, having a diameter substantially equal to the outside diameter of the ring 14, and is flat, the tops of the slats lying in the same plane.

As best seen in FIG. 2, the ring 14 is coupled to the ends of the bottom of each of the slats 12, such as by welding. The support rods 16 and 18 extends in a direction perpendicular to the larger sides of the slats 12 in a chordwise fashion relative to the ring 14, having the ends thereof coupled to the inside periphery of the ring 14. Preferably, the rods 16 and 18 are elongated steel bars having rectangular cross-sections, the rods being parallel and spaced from each other a distance substantially equal to one-third the radius of the ring 14. In addition to being coupled to the ring 14, the rods 16 and 18 are coupled, such as by welding, to the bottom surfaces of the slats 12, such relationship shown best in FIG. 4.

The U-shaped handles 20 and 22 are preferably secured to the outside periphery of the ring 14 by welding and are positioned between the support rods 16 and 18.

In a preferred embodiment, the width X of each slat is three-fourths inch and the height Z is one-fourth inch. The distance Y is approximately one-sixtyfourth of an inch and approximately 34 slats are utilized to form the supporting surface for the food. Although the dimensions of this preferred embodiment provide a ratio of the width of each slot to the width of each slat of 1 to 48, it is apparent that the width of each slot must merely be large enough to allow smoke eminating from the charcoal fire to pass upwardly therethrough to contact and smoke the food supported on the slats, and yet small enough to prevent a substantial portion of the frying substances located on the tops of the slats from falling through the slots into the fire itself, thereby allowing frying of the food. Only a substantial portion of the frying substance remains on the grate, with the rest falling through the grill, contacting the coals and generating the smoke desired to smoke the food.

Figure 7:
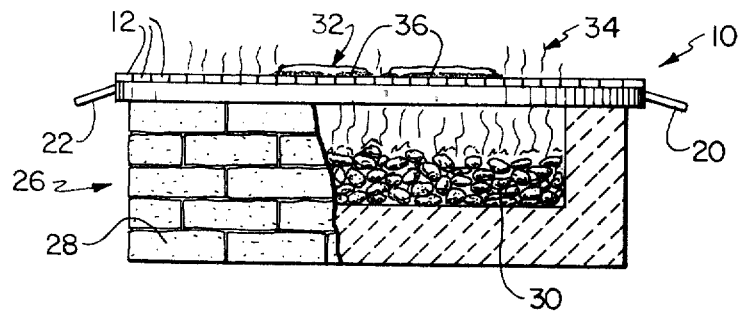
FIG. 7 is a side elevational view of a barbecue assembly, with parts broken away, having a charcoal fire therein and the grate in accordance with the present invention supported thereon.

Turning now to FIG. 7, the grate 10 is shown supported on a conventional charcoal burning barbecue 26 which includes a cylindrical housing 28 formed of refractory material, such as bricks, having a supply of charcoals 30 contained therein. Once the charcoal fire is started and has become hot enough, the grate 10 is placed on the top of the housing 28 so that the slats 12 are directly above the glowing charcoals 30. If desired, sauce, grease or fatty substances may be spread over the top of the slats at this time.

Once the metal grate 10 has been heated to the desired temperature by the charcoal fire, a food substance 32 is placed on the grate 10 in a position spanning a plurality of the slats 12. Previously or at this time more sauce or fat may be added to the food substance and the process of cooking the food substance 32 begins.

This cooking process includes four simultaneous processes, that is, smoking, broiling, grilling and frying.

The broiling process occurs by means of radiant heat directly contacting the food substance 32, such heat eminating from the burining charcoals and passing between the slots 24.

The grilling process occurs by means of the contact of the food substance 32 with the now heated metal slats 12. Since the width of each slat is substantially greater than the width of each slot, the food substance is subjected to a relatively uniform grilling by the heated slats.

The smoking process, in which the food substance 32 obtains a charcoal flavor, results from the contact of the food substance with the smoke, generally indicated at 34, generated by the contact of the frying substance with the burning charcoals 30. As shown in FIG. 6, the smoke 34 eminating from this contact moves upwardly from the charcoals 30, through the slots 24 and into direct contact with the bottom of the food substance 32.

The frying process results from the contact of the frying substance, generally designated 36, with the food substance 32, this contact being provided because a portion of the frying substance 36 is kept in a contiguous relationship with the food substance due to the relatively small width of the slots in relation to the width of the slats. Although some of the liquid fat or sauce comprising the frying substance might fall through the slots, this is minimized due to the minute width of each slot.

Although only one food substance 32 has been shown and the cooking thereof described, it is apparent that a plurality of food substances may be simultaneously cooked by the four processes outlined above. Additionally, as described herein the use of the grate 10 has been described in relation to cooking only one side of the food substance. Obviously, the food substance can be turned repeatedly to provide cooking to all sides of the food substance and the exposure of the food to the cooking process can be timed to provide rare, medium or well done food as desired.

The foregoing description has been couched in terms of a charcoal fire or a charcoal type of fire, but a wood or gas flame type of fire is considered usable. Also, it will be understood that the present invention is intended to be used with a heat source which is not primarily or exclusively an open flame source. Recent innovations in such cooking devices, such as those in which pieces of mineral material, of a relatively permanent nature, are heated by electricity or gas flame to a radiant cooking temperature, are similar in nature to charcoal cookers and are intended to be included within the term "radiant heat source" as used herein.

Figure 8:
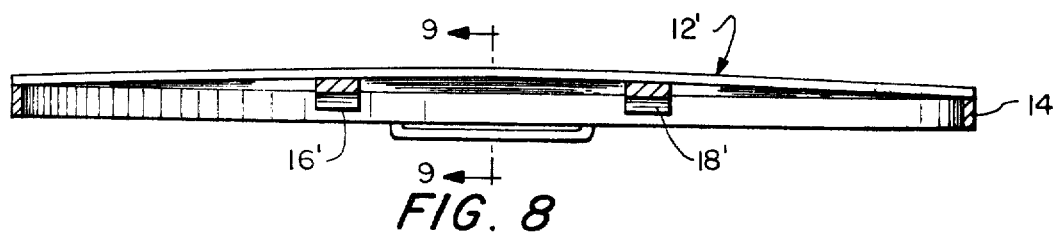
FIG. 8 is a sectional view similar to FIG. 4 but showing a modified embodiment of the grate.
Figure 9:
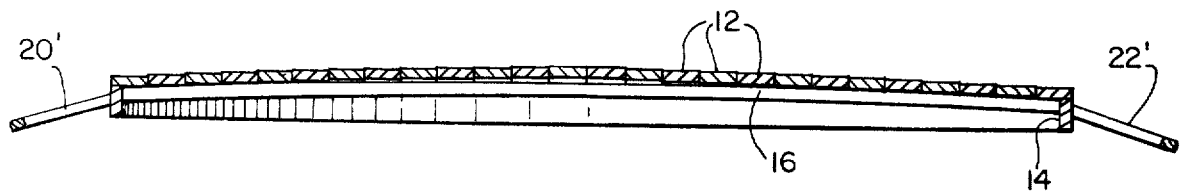
FIG. 9 is a sectional view of the modified grate taken along line 9—9 of FIG. 8.

As shown in FIGS. 8 and 9, a modified embodiment of the grate is illustrated in which the tops of the slats form a non-planar, curved, convex surface rather than a flat, planar surface as shown in FIGS. 3 and 4.

It has been found that after the grate has been repeatedly exposed to high heat, the slats and support rods expand to a substantially permanent convex configuration. Therefore, it is considered advantageous to initially provide a slightly convex surface to the slats to assure that the expansion takes place in the desired direction, thereby preventing the expansion from causing buckling or destruction of the overall grate structure.

Specifically, as shown in FIG. 8, slats 12' have a convex configuration extending upwardly from their ends fastened to the top of the ring 14'. Preferably, the mid-portions of the tops of the slats in the middle of the grate are approximately one-fourth inch to one-half inch above the tops of ends of the slats. The slats spaced on either side of the middle of the grate have less of a convex bend, thus providing a substantially continuous convex or dome-like surface to the grate in every direction as shown in FIGS. 8 and 9. The support rods 16' and 18' also are formed in a convex configuration, and as best seen in FIG. 9, each rod is connected to each slat as in the embodiment of FIGS. 3 and 4.

The embodiment of FIGS. 8 and 9 is used in a similar fashion as that of FIGS. 3 and 4 and as described in detail above.

While one advantageous embodiment has been chosen to illustrate the invention, it will be understood by those skilled in the art that various changes and modifications can be made therein without departing from the scope of the invention as defined in the appended claims.

What is claimed is:

1. A grate for a barbecue grill, this grate to be positioned above a radiant heat source and to support food to be cooked by the heat therefrom, the food having a frying substance associated therewith, comprising:

metal support assembly means for supporting the food and for supporting a substantial portion of the frying substance in a position contiguous to the food, said support assembly means including a plurality of parallel, spaced apart slats defining a plurality of minute slots between adjacent edges thereof, a continuous ring rigidly coupled to the bottom surface of each of said slats adjacent the ends of each of said slats, and a plurality of spaced apart parallel support rods rigidly coupled to the bottom surface of each of said slats extending perpendicular to said slats and rigidly coupled at their ends to the inside periphery of said ring;

said slats each having a substantially flat top surface; and said minute slots each having a width much less than one-half the width of each of said slats, thereby allowing smoke from the radiant heat source to pass upwards into contact with the food on said support assembly means and allowing only a small portion of the frying substance to pass downwards through said support assembly means where it contacts the radiant heat source and forms the smoke, said width of said minute slots being fixed in dimension by the rigid coupling of said slats to said ring and said rods.

2. A grate according to claim 1, wherein said slats are rectangular in cross-section.

3. A grate according to claim 1, wherein the distance between adjacent slats and the width of one of said slats are in a ratio of 1 to 48.

4. A grate according to claim 1, wherein each of said slots has a rectangular cross-sectional configuration.

5. A grate according to claim 1, wherein the top surfaces of said slats are co-planar.

6. A grate according to claim 1, wherein the grate support surface formed by the tops of all said slats is substantially a convex surface.

* * * * *